(12) United States Patent
Jeong et al.

(10) Patent No.: US 10,091,761 B2
(45) Date of Patent: Oct. 2, 2018

(54) APPARATUS AND METHOD FOR PAGING IN WIRELESS COMMUNICATION SYSTEM

(71) Applicant: Samsung Electronics Co., Ltd., Suwon-si, Gyeonggi-do (KR)

(72) Inventors: Sang-Soo Jeong, Suwon-si (KR); Jin-Uk Lee, Suwon-si (KR); Song-Yean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/595,776

(22) Filed: May 15, 2017

(65) Prior Publication Data

US 2017/0251451 A1 Aug. 31, 2017

Related U.S. Application Data

(63) Continuation of application No. 14/596,197, filed on Jan. 13, 2015, now Pat. No. 9,655,079.

(30) Foreign Application Priority Data

Jan. 13, 2014 (KR) ........................ 10-2014-0004248

(51) Int. Cl.
*H04W 68/00* (2009.01)
*H04W 8/22* (2009.01)
(Continued)

(52) U.S. Cl.
CPC .......... *H04W 68/005* (2013.01); *H04W 8/22* (2013.01); *H04W 36/0022* (2013.01); *H04W 64/003* (2013.01); *H04W 72/10* (2013.01)

(58) Field of Classification Search
CPC .......... H04W 68/005; H04W 36/0022; H04W 64/003; H04W 72/10; H04W 8/22
(Continued)

(56) References Cited

U.S. PATENT DOCUMENTS 7,450,540 B2 11/2008 Gronberg et al.
8,902,860 B2 * 12/2014 Laroia ................... H04L 5/0035
370/336
(Continued)

FOREIGN PATENT DOCUMENTS

CN 101616510 A 12/2009
CN 101771982 A 7/2010
(Continued)

OTHER PUBLICATIONS

International Search Report dated Mar. 31, 2015 in connection with International Patent Application No. PCT/KR2015/000336, 4 pages.
(Continued)

*Primary Examiner* — Hirdepal Singh

(57) ABSTRACT

Provided is a method for paging a User Equipment (UE) in an idle state by a Mobility Management Entity (MME) in a wireless communication network in which a Packet Switched (PS) domain and a Circuit Switched (CS) domain coexist. The method includes receiving a CS page message for paging the UE in a CS domain; and upon receiving the CS page message, sending a PS page message for paging the UE in a PS domain, the PS page message including a priority indicator, to an Evolved Node B (ENB) where the UE is located.

14 Claims, 8 Drawing Sheets

(51) Int. Cl.
*H04W 36/00* (2009.01)
*H04W 64/00* (2009.01)
*H04W 72/10* (2009.01)

(58) Field of Classification Search
USPC ........................................................ 455/458
See application file for complete search history.

(56) References Cited

U.S. PATENT DOCUMENTS

| | | | |
|---|---|---|---|
| 9,198,083 B1* | 11/2015 | Rai | ........................ H04W 28/18 |
| 9,445,310 B2 | 9/2016 | Aoyagi et al. | |
| 9,713,040 B2* | 7/2017 | Cheng | ............... H04W 36/0033 |
| 2011/0077011 A1 | 3/2011 | Wang et al. | |
| 2011/0103277 A1 | 5/2011 | Watfa et al. | |
| 2011/0310804 A1 | 12/2011 | Beygzadeh | |
| 2012/0064884 A1 | 3/2012 | Ramachandran et al. | |
| 2012/0122459 A1* | 5/2012 | Wu | ................... H04W 36/0022 |
| | | | 455/437 |
| 2012/0287907 A1 | 11/2012 | Yu | |
| 2013/0040645 A1 | 2/2013 | Nishida et al. | |
| 2013/0143515 A1 | 6/2013 | Zhu et al. | |
| 2013/0170347 A1* | 7/2013 | Zhang | .................... H04W 4/70 |
| | | | 370/230 |
| 2014/0016616 A1* | 1/2014 | Wass | ..................... H04W 76/10 |
| | | | 370/331 |
| 2014/0162705 A1 | 6/2014 | De Wit et al. | |
| 2014/0376360 A1 | 12/2014 | Lisak et al. | |
| 2015/0282120 A1 | 10/2015 | Liao | |
| 2016/0249266 A1* | 8/2016 | Kim | ........................ H04W 4/06 |

FOREIGN PATENT DOCUMENTS

| | | |
|---|---|---|
| CN | 102123442 A | 7/2011 |
| CN | 102355704 A | 2/2012 |
| CN | 102763457 A | 10/2012 |
| CN | 102948233 A | 2/2013 |
| EP | 2015526 A2 | 1/2009 |

OTHER PUBLICATIONS

Written Opinion of International Searching Authority dated Mar. 31, 2015 in connection with International Patent Application No. PCT/KR2015/000336, 7 pages.

First Office Action, regarding Chinese Patent Application No. 201580000142.0, dated Nov. 16, 2017, 14 pages.

NTT DOCOMO, "CS Fallback priority service solution for eMPS", 3GPP TSG SA WG2 Meeting #77, TD S2-100866, Jan. 2010, 3 pages.

Office Action dated Aug. 3, 2018 in connection with Chinese Patent Application No. 201580000142.0.

* cited by examiner

APPARATUS AND METHOD FOR PAGING IN WIRELESS COMMUNICATION SYSTEM

CROSS-REFERENCE TO RELATED APPLICATION(S) AND CLAIM OF PRIORITY

The present application is a continuation of U.S. patent application Ser. No. 14/596,197 filed Jan. 13, 2015, and is related to and claims the benefit under 35 U.S.C. § 119(a) of a Korean patent application filed in the Korean Intellectual Property Office on Jan. 13, 2014, and assigned Serial No. 10-2014-0004248, the entire disclosure of which is incorporated herein by reference.

TECHNICAL FIELD

The present disclosure relates to an apparatus and method for paging a User Equipment (UE) in a wireless communication system.

BACKGROUND

A mobile communication system has been developed based on the wireless communication network for the purpose of providing communication services while ensuring the user's mobility. The mobile communication system provides high-speed data communication services in addition to voice call services.

For example, the mobile communication system has evolved from a 3rd Generation Partnership Project (3GPP) system into a Long Term Evolution (LTE) system. The LTE system provides data communication services at a maximum of about 100 Mbps.

The LTE system has evolved into an LTE-Advanced (LTE-A) system for the purpose of improving the transmission rate. In the following description, for convenience, the LTE system and the LTE-A system will both be referred to as an 'LTE system'.

The LTE system may provide voice call services for a User Equipment (UE) both in a Packet Switched (PS) domain and a Circuit Switched (CS) domain. For example, Voice over LTE (VoLTE) technology is technology in which the LTE system supports voice call services in the PS domain, and Circuit Switched FallBack (CSFB) technology is technology in which the LTE system supports voice call services in the CS domain. The VoLTE technology may be used as the same concept as Voice over IP Multimedia Subsystem (IMS) (VoIMS) in the LTE system.

In the LTE system, a UE performs a CSFB procedure upon request for an incoming or outgoing voice call service while using the LTE network. The CSFB procedure defines an operation of switching from the LTE network (or the PS network) to the 3G network (or the CS network).

For example, if an incoming call for a UE occurs in the LTE system, a base station or an Evolved Node B (ENB) notifies the UE of the call termination in accordance with a predefined paging procedure. Upon recognizing the call termination, the UE sends a service request message to the eNB in response thereto. The service request message sent by the EU enables the CSFB procedure to be conducted in the LTE system. In the CSFB procedure, it is premised that a UE cannot use the LTE network and the 3G network at the same time.

However, the LTE system does not provide a scheme for handling paging for a CS service while a paging procedure by a PS service is ongoing, for a UE in an idle mode.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method for preferentially handling paging for a CS service that occurs while a paging procedure for a PS service is not completed in an LTE system.

Another aspect of an embodiment of the present disclosure is to provide an apparatus and method for handling paging for a CS service even while a paging procedure by a PS service is not completed, for a UE in an idle mode in a wireless communication system.

Another aspect of an embodiment of the present disclosure is to provide an apparatus and method for simplifying the necessary authentication/security information exchange procedure if switching between different systems is required for a particular service in a wireless communication system.

Another aspect of an embodiment of the present disclosure is to provide an apparatus and method for inquiring of an ENB about radio capability of a UE if the UE is out of an area where a voice service is provided at a predetermined quality in a core network of a wireless communication system.

In accordance with an aspect of the present disclosure, there is provided a method for paging a User Equipment (UE) in an idle state by a Mobility Management Entity (MME) in a wireless communication network. The method includes receiving a CS page message for paging the UE in a CS domain; and upon receiving the CS page message, sending a PS page message for paging the UE in a PS domain, the PS page message including a priority indicator, to an Evolved Node B (ENB) where the UE is located.

In accordance with another aspect of the present disclosure, there is provided an MME for paging a UE in an idle state in a wireless communication network. The MME includes an interface configured to perform communication with an external device; and a controller configured to perform control for receiving a CS page message for paging the UE in a CS domain through the interface, and sending a PS page message for paging the UE in a PS domain, the PS page message including a priority indicator, to an ENB where the UE is located, through the interface.

In accordance with further another aspect of the present disclosure, there is provided a method for paging a UE in an idle state by an ENB in a wireless communication network. The method includes receiving a PS page message for paging the UE in a PS domain from an MME; if the received PS page message includes a priority indicator, performing a paging procedure with the UE by the received PS page message in preference to another page message that was received from the MME for paging of the UE, and a paging procedure by which is not completed.

In accordance with yet another aspect of the present disclosure, there is provided an ENB for paging a UE in an idle state in a wireless communication network. The ENB includes a transceiver configured to support communication for paging the UE; and a controller configured to receive a PS page message for paging the UE in a PS domain from an MME, and if the received PS page message includes a priority indicator, to perform a paging procedure with the UE by the received PS page message in preference to another page message that was received from the MME for paging of the UE, and a paging procedure by which is not completed.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
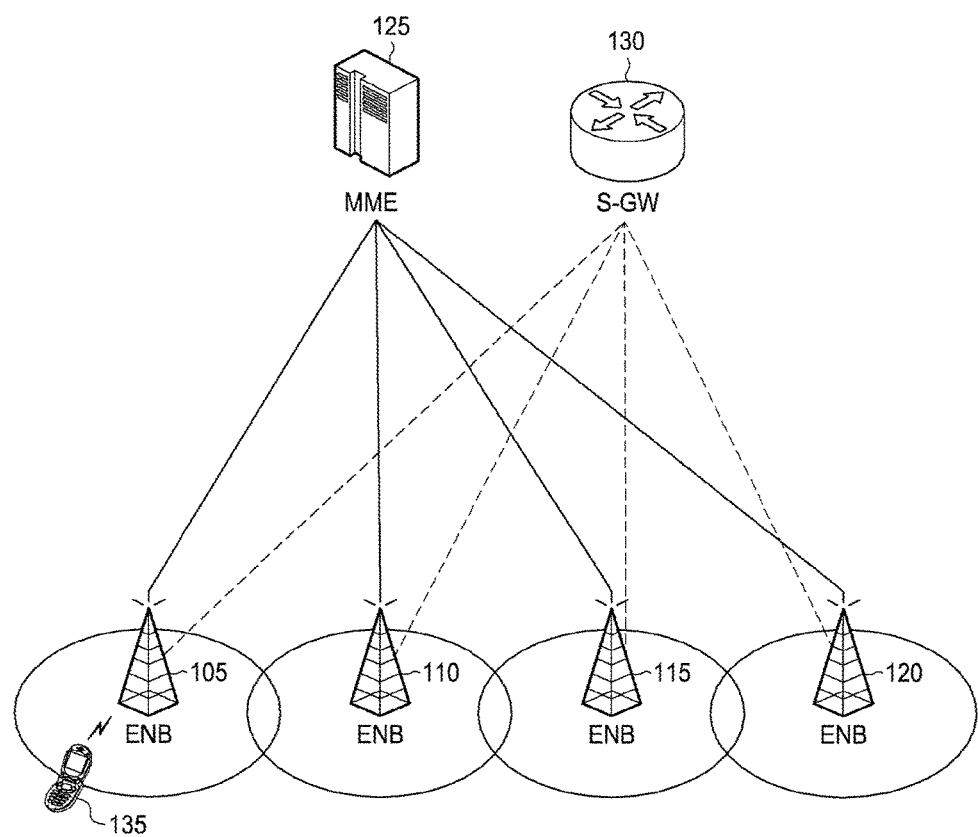
FIG. 1 illustrates a configuration of a Long Term Evolution (LTE) system to which embodiments of the present disclosure are applicable.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. The present disclosure includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present disclosure will be described in detail with reference to an Orthogonal Frequency Division Multiplexing (OFDM)-based wireless communication system, especially a wireless communication system defined in 3GPP Evolved Universal Terrestrial Radio Access (EUTRA). However, it will be apparent to those of ordinary skill in the art that the key technical features in the proposed embodiments of the present disclosure may be applied to any other communication systems having the similar technical background and channel format with slight modifications without departing from the scope and spirit of the present disclosure.

The below-described embodiments of the present disclosure may include a Circuit Switched FallBack (CSFB) process in which a UE switches from an LTE network (or a PS domain) to a CS network (or a CS domain) for a voice service, and a CSFB to 1×RTT process in which the UE switches from the LTE network (or the PS domain) to a 1×RTT network (or the CS domain).

In the following description and drawings, the LTE network may be used as the same meaning as Evolved Universal Terrestrial Radio Access Network (E-UTRAN) supporting a CS service, and the CS network may be Universal Terrestrial Radio Access Network (UTRAN), GSM EDGE Radio Access Network (GERAN), 1×RTT (or CDMA2000), or a network similar thereto, capable of supporting the CS service. These networks may be referred to as a 'legacy network'. In the following description and drawings, the expression that a UE exists in one network may be used as the meaning including both of a case where a UE is being connected to one network, and a case where a UE is camping in an idle state. A term 'base station' may correspond to an Evolved Node B (ENB or eNodeB) in the case of E-UTRAN.

In the following description and drawings, a Home Subscriber Server (HSS) may be an entity that is the same as a Home Location Register (HRL), or an entity that is physically attached to the HRL.

An embodiment of the present disclosure will be described in detail below with reference to the accompanying drawings.

FIG. 1 illustrates a configuration of an LTE system to which embodiments of the present disclosure are applicable. However, the applicable embodiments of the present disclosure may not necessarily be applied only to the LTE system.

Referring to FIG. 1, a Radio Access Network (RAN) constituting the LTE system may include ENBs 105, 110, 115 and 120, a Mobility Management Entity (MME) 125, and a Serving-Gateway (S-GW) 130. The ENBs 105, 110, 115 and 120 and the S-GW 130 may connect a UE 135 to an external network. Although not shown, in order to connect the UE 135 to the external network, the LTE system may further include a Packet Data Network (PDN) Gateway (P-GW).

The ENBs 105, 110, 115 and 120 may connect with the UE 135 over a wireless channel. The ENB in the LTE system may correspond to a Radio Network Controller (RNC) in the UTRAN system or a Base Station Controller (BSC) in the GERAN system.

For example, the ENB 105 may connect a wireless channel to the UE 135, and play a role similar to the RNC or the BSC. The ENB 105 may use multiple cells at the same time.

The LTE system may service most of the user traffic including a real-time service such as Voice over Internet Protocol (VoIP), using a shared channel. Therefore, the LTE system may require a device for performing scheduling by collecting the status information such as UE's buffer status, available transmit power status and channel status. This is in charge of the ENB.

The LTE system may use 20 MHz bandwidth-based OFDM as the radio access technology in order to implement the transmission rate of 100 Mbps.

An Adaptive Modulation & Coding (AMC) scheme may be applied to the UE 135. The AMC scheme is technology of adaptively using a modulation scheme and a channel coding rate taking the channel status into consideration.

The S-GW 130 may generate or release data bearers to the external network and the ENBs 105, 110, 115 and 120, under control of the MME 125. The MME 125 may be connected to the multiple ENBs 105, 110, 115 and 120 to manage the mobility of the UE 135 and handle various control functions.

A core network of the LTE system may further include nodes such as an Application Function (AF), a Policy Charging and Rules Function (PCRF) and a P-GW, in addition to the MME 125 and the S-GW 130.

The AF may exchange application-related information with the user at an application level. The PCRF may control the policy related to the user's Quality of Service (QoS). A Policy and Charging Control (PCC) rule corresponding to the policy may be applied by being delivered to the P-GW. The PCRF is an entity that collectively controls QoS and charging for traffic.

In the LTE system, an uplink may refer to a path that connects a UE to the P-GW through the ENB and the S-GW, and a downlink may refer to a path that connects the P-GW to a UE through the S-GW and the ENB.

In the uplink and the downlink, a wireless channel whose resource allocation is severely limited may be used to connect the UE and the ENB.

In the LTE system, the basic unit in which QoS can be applied may be an Evolved Packet System (EPS) bearer. One EPS bearer may be used to transmit IP Flows in which the same QoS is required. QoS-related parameters may be specified for the EPS bearer. For example, the QoS-related parameters may include a QoS Class Identifier (QCI), and an Allocation and Retention Priority (ARP). The QCI is a parameter obtained by defining a QoS priority as an integer value. The ARP is a parameter used to determine whether to accept or reject the generation of a new EPS bearer.

The EPS bearer may correspond to a Packet Data Protocol (PDP) context of a General Packet Radio Service (GPRS) system. One EPS bearer may belong to a PDN connection. The PDN connection may have an Access Point Name (APN) as the PDN connection's attribute.

For example, if a PDN connection for an IP Multimedia Subsystem (IMS) service such as VoLTE is generated, the PDN connection may be generated using the well-known IMS APN.

Figure 2:
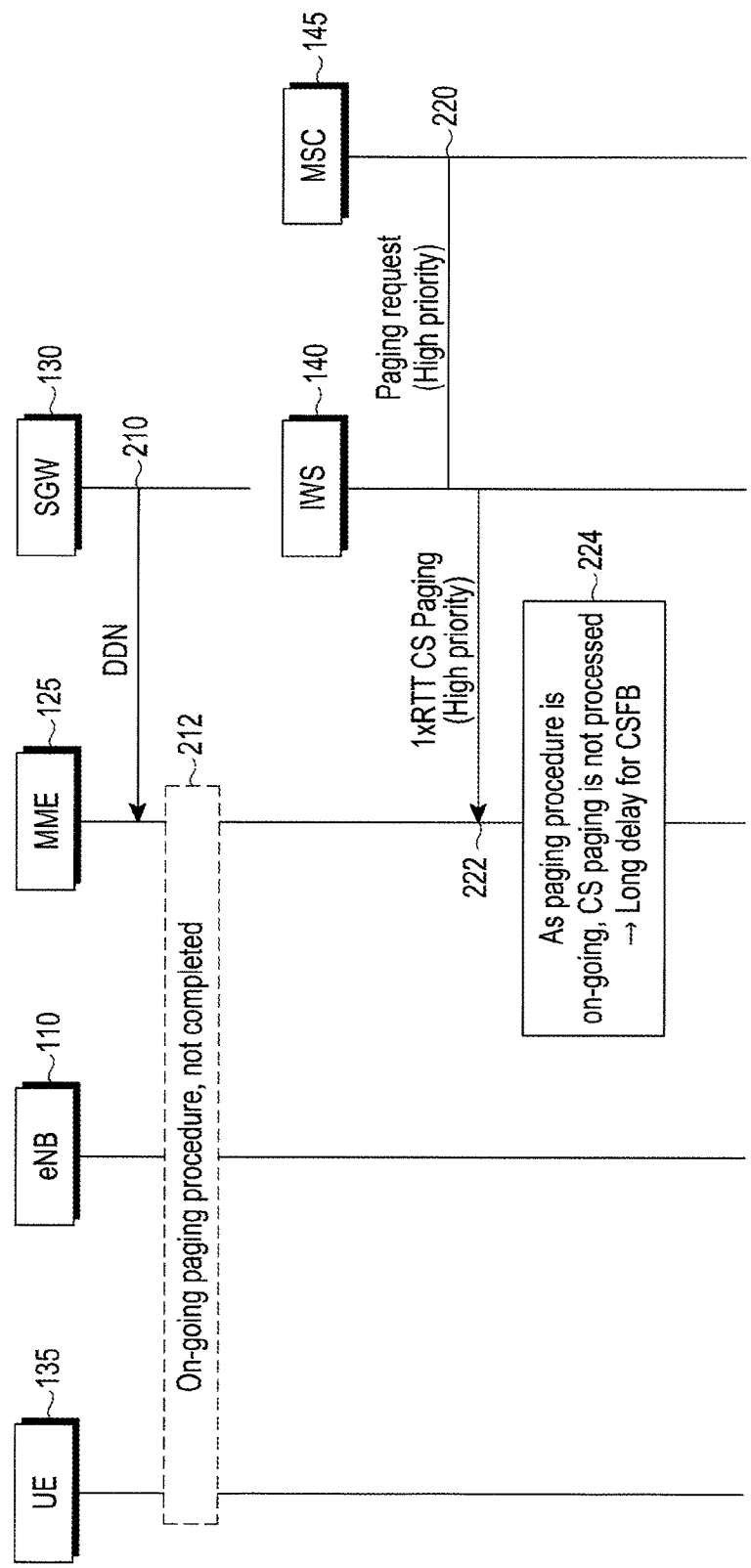
FIG. 2 illustrates an example of a call termination scenario according to an embodiment of the present disclosure.

FIG. 2 illustrates an example of a call termination scenario according to an embodiment of the present disclosure. The scenario shown in FIG. 2 is assumed as a scenario (CSFB to 1×RTT) in which while using the LTE network, a UE moves (or switches) to a 1 times Radio Transmission Technology (1×RTT) network for a voice service. The 1×RTT represents a Code Division Multiple Access (CDMA) 2000 scheme among the 3G mobile communication systems.

Referring to FIG. 2, the S-GW 130 may send a Downlink Data Notification (DDN) message to the MME 125 in operation 210. The DDN message may be a message for notifying that downlink PS data for a particular UE 135 in the idle mode has occurred in the LTE system. In other words, the DDN message may be a page message for notifying that paging of the particular UE 135 has occurred in the PS domain.

Upon receiving the DDN message, the MME 125 may perform a paging procedure for the PS domain in operation 212. For example, in the paging procedure for the PS domain, the MME 125 may page the ENB 110 where the particular UE 135 is located. The particular UE 135 is a UE in the idle mode, for which downlink PS data has occurred. For the PS service, the ENB 110 paged by the MME 125 may page the particular UE 135 so as to allow the paging procedure for the PS domain to be initiated.

A CS service request may occur while the paging procedure for the PS domain is ongoing (e.g., while the paging procedure for the PS domain is not completed). The CS service request may correspond to receiving by the MME 125 a paging request (1×RTT CS Paging) for requesting a CS service from a 1×RTT network. For example, the CS service request from the 1×RTT network may be made by a procedure in which a Mobile Switching Center (MSC) 145 sends a paging request (Paging Request) to an Interworking Solution (IWS) 140 for a CS service in operation 220, and the IWS 140 sends a paging request (1×RTT CS Paging) to the MME 125 in operation 222. The paging request (Paging Request) by the MSC 145 in operation 220 and the paging request (1×RTT CS Paging) by the IWS 140 in operation 222 may include high-priority identification information (High priority).

The MME 125 may not handle the received paging request (1×RTT CS Paging) for requesting a CS service, since the paging procedure for the PS domain is not completed. The reason is because in the LTE system based on the CSFB technology, the MME 125 cannot perform a paging procedure for a PS service and a paging procedure for a CS service at the same time. In other words, since the paging procedure for the PS domain is ongoing, it is difficult for the MME 125 to perform switching to a CS network, for paging for a CS service.

Generally, in a CS service, more real-time handling is required, compared with in a PS service. The calls due to the public services in, for example, fire stations and police stations may occur using the CS service. Therefore, it is general that the calls occurring for the CS service are higher in priority than the calls occurring for the PS service.

Given the foregoing background, it is necessary that the LTE system is implemented to make it possible to handle the calls for the CS domain even while the paging procedure for the PS domain is ongoing.

In the proposed embodiment, if paging for the CS domain occurs while the paging procedure for the PS domain is ongoing, the occurred paging for the CS domain may be set to be preferentially applied by the UE. It is premised that the paging for the CS domain occurs for the UE in the idle mode, the paging procedure for the PS domain for which is ongoing. This scheme may increase the quality of the CS service provided by the LTE system.

In the embodiment described below, a first approach may be based on CSFB to 1×RTT, in which a UE that is now using the LTE network switches to the 1×RTT network for the CS service such as voice calls, and a second approach may be based on CSFB, in which a UE that is now using the LTE network switches to the CS network for the CS service such as voice calls.

The technical features in the proposed embodiments are to preferentially handle paging for a CS service, which occurs while the paging procedure for the PS service is not completed. This will reduce or minimize the service delay. This may be applied even to the mobile communication systems or services having the similar technical background with slight modifications obvious to those of ordinary skill in the art.

Figure 3:
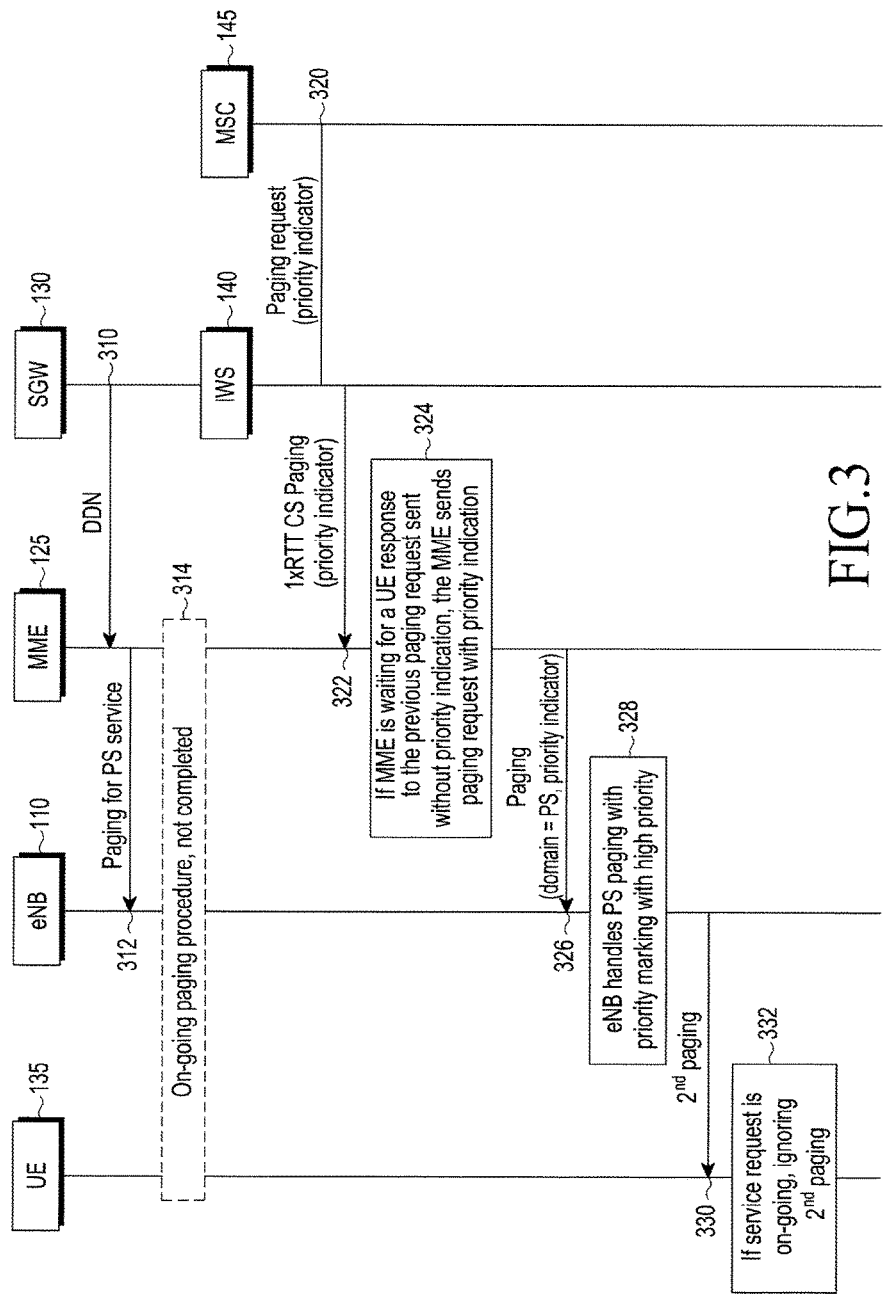
FIG. 3 illustrates a scenario for a paging procedure in an LTE system according to an embodiment of the present disclosure.

FIG. 3 illustrates a scenario for a paging procedure in an LTE system according to an embodiment of the present disclosure. The scenario shown in FIG. 3 is assumed as a situation in which based on CSFB to 1×RTT, paging for the CS domain has occurred before paging for the PS domain is delivered to the UE.

Referring to FIG. 3, the S-GW 130 may send a DDN message, which is a paging request for a PS service, to the MME 125 in operation 310. The DDN message may include no priority identification information.

Upon receiving the DDN message, the MME 125 may perform the paging procedure for the PS domain.

For example, the MME 125 may page the ENB 110 where the particular UE 135 is located, for the PS service in operation 312. In other words, the MME 125 may send a page message (PS page message) for the PS service to the ENB 110. The particular UE 135 may be a UE in the idle mode, for which downlink PS data has occurred. For example, for the PS service, the MME 125 may send, to the ENB 110, a page message with no priority indicator (hereinafter referred to as 'first page message' or 'initial page message'; or 'first PS page message' or 'initial PS page message').

Upon receiving the initial page message, the ENB 110 may page the UE 135 to which the ENB 110 will provide the PS service, and allow the paging procedure for the PS domain to be initiated through the paging, in operation 314. However, the procedure described below is not necessarily performed after paging for the UE 135 is made. In other words, the procedure described below may be performed before the paging for the UE 135 is made. In the following description, the expression "while the paging procedure for the PS domain is ongoing (e.g., while the paging procedure for the PS domain is not completed)" may be construed to include an expression "before paging for the UE 135 is made". This may generally correspond to a case where it is difficult for the ENB to smoothly handle all the paging requests since many paging requests are piled up in the paging queue of the ENB.

Paging for the CS service may occur before the paging procedure for the PS domain is completed. The paging for the CS service may occur as the MME 125 receives a page message (1×RTT CS Paging) with a priority indicator from the CSFB to 1×RTT-based network.

For example, the MSC 145 of the CSFB to 1×RTT-based network may send a page message with a priority indicator to the IWS 140 in operation 320. Based on the page message sent from the MSC 145, the IWS 140 may deliver a page message (1×RTT CS Paging) with a priority indicator to the MME 125 in operation 322.

If the MME 125 receives the page message (1×RTT CS Paging) for the CS domain from the IWS 140 while the paging procedure for the PS domain is not completed, the MMS 125 may stop the ongoing paging procedure for the PS service and preferentially handle a paging procedure for the CS service.

For example, the state where the paging procedure for the PS domain is not completed means a state where a related timer (e.g., a T3413 timer) is in operation. Therefore, by stopping the operation of the related timer (e.g., the T3413 timer), it is possible for the MME 125 to stop the ongoing paging procedure for the PS service.

The MME 125 may set, as PS, a domain of the page message (hereinafter referred to as 'second page message' or 'additional page message'; or 'second PS page message' or 'additional PS page message') for requesting the CS service, and then send the set page message to the ENB 110 in operations 324 and 326. The additional page message may include a priority indicator for requesting to preferentially perform the paging procedure for the CS service. By setting the domain as PS, the MME 125 may send the additional page message for PS to the ENB 110.

The ENB 110 may receive the additional page message with a priority indicator from the MME 125. The ENB 110 may handle the additional page message taking into account whether the additional page message includes a priority indicator in operation 328.

Since the additional page message includes a priority indicator, the ENB 110 may deliver the additional page message to the UE 135 in operation 330. In order to deliver the additional page message to the UE 135, it should be premised that the paging procedure according to the previously received initial page message is not completed. The delivery of the additional page message may enable the paging procedure for the CS domain to be performed between the ENB 110 and the UE 135.

For example, if the ENB 110 receives the additional page message before delivering the initial page message to the UE 135, the ENB 110 may deliver the additional page message to the UE 135 in preference to the initial page message in operation 330. In this case, since the UE 135 receives only the additional page message, the UE 135 may perform the paging procedure for the CS service in operation 332.

The ENB 110 may receive the additional page message after delivering the initial page message to the UE 135. In this case, the ENB 110 may deliver the additional page message to the UE 135 in operation 330. The UE 135 may disregard the received additional page message, since the paging procedure for the PS service is already initiated. Even when the UE 135 receives the additional page message after initiating the paging procedure for the PS service, the UE 135 may disregard the received additional page message.

Figure 4:
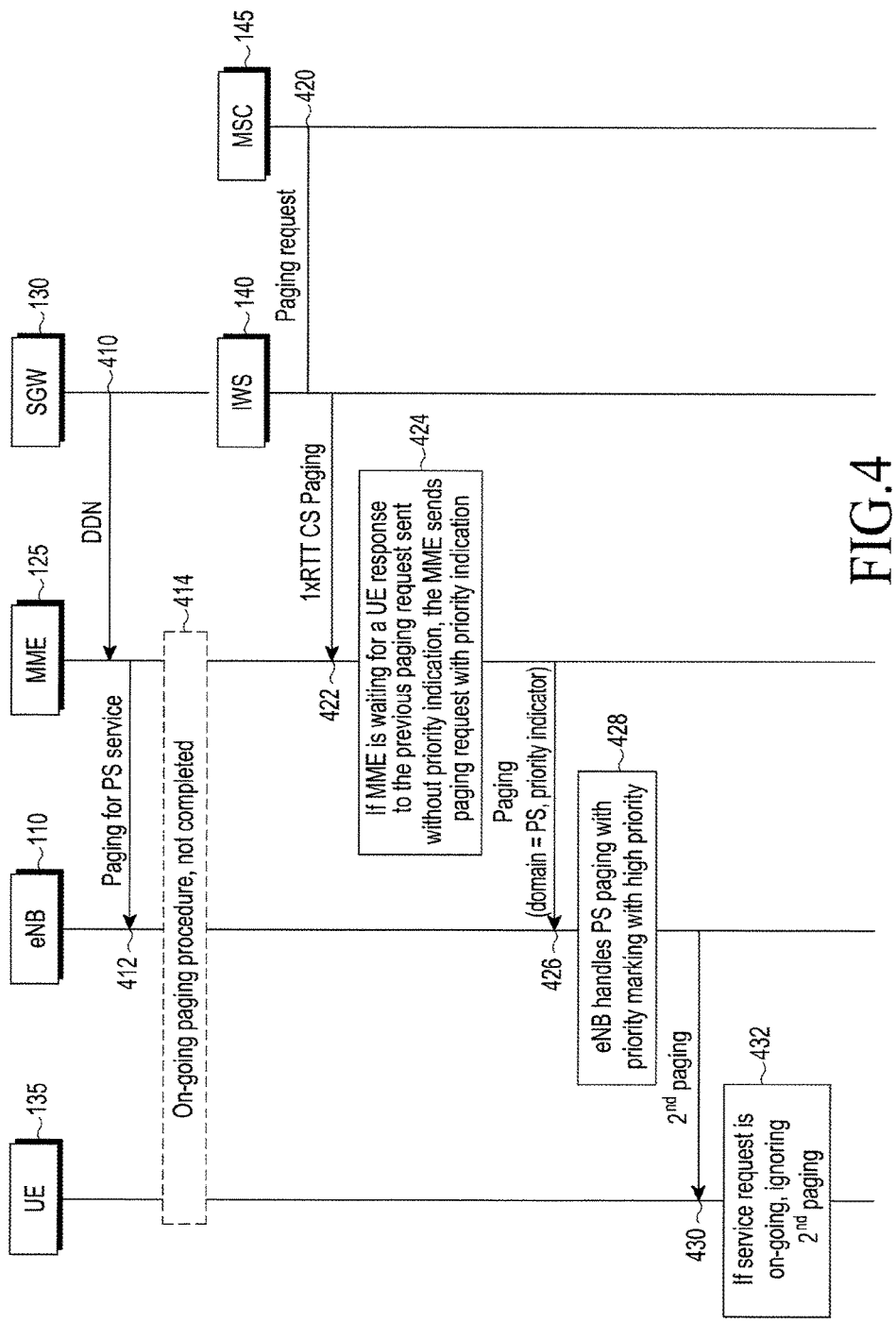
FIG. 4 illustrates another scenario for a paging procedure in an LTE system according to an embodiment of the present disclosure.

FIG. 4 illustrates another scenario for a paging procedure in an LTE system according to an embodiment of the present disclosure. The scenario shown in FIG. 4 is assumed as a situation in which based on CSFB to 1×RTT, paging for the CS domain has occurred after paging for the PS domain is delivered to the UE.

Referring to FIG. 4, the S-GW 130 may send a DDN message, which is a paging request for a PS service, to the MME 125 in operation 410. The DDN message may include no priority identification information.

Upon receiving the DDN message, the MME 125 may perform the paging procedure for the PS domain.

For example, the MME 125 may page the ENB 110 where the particular UE 135 is located, for the PS service in operation 412. In other words, the MME 125 may send a page message (PS page message) for the PS service to the ENB 110. The particular UE 135 may be a UE in the idle mode, for which downlink PS data has occurred. For example, for the PS service, the MME 125 may send an initial page message with no priority indicator to the ENB 110.

Upon receiving the initial page message, the ENB 110 may page the UE 135 to which the ENB 110 will provide the PS service, and allow the paging procedure for the PS domain to be initiated through the paging, in operation 414. However, the procedure described below is not necessarily performed after paging for the UE 135 is made. In other words, the procedure described below may be performed before the paging for the UE 135 is made. In the following description, the expression "while the paging procedure for the PS domain is ongoing (e.g., while the paging procedure for the PS domain is not completed)" may be construed to include an expression "before paging for the UE 135 is made". This may generally correspond to a case where it is difficult for the ENB to smoothly handle all the paging requests since many paging requests are piled up in the paging queue of the ENB.

Paging for the CS service may occur before the paging procedure for the PS domain is completed. The paging for the CS service may occur as the MME 125 receives a page message (1×RTT CS Paging) with no priority indicator from the CSFB to 1×RTT-based network.

For example, the MSC 145 of the CSFB to 1×RTT-based network may send a page message with no priority indicator to the IWS 140 in operation 420. Based on the page message sent from the MSC 145, the IWS 140 may deliver a page message (1×RTT CS Paging) with no priority indicator to the MME 125 in operation 422.

If the MME 125 receives the page message (1×RTT CS Paging) for the CS domain from the IWS 140 while the paging procedure for the PS domain is not completed, the MMS 125 may stop the ongoing paging procedure for the PS service and preferentially handle a paging procedure for the CS service.

For example, the state where the paging procedure for the PS domain is not completed means a state where a related timer (e.g., a T3413 timer) is in operation. Therefore, by stopping the operation of the related timer (e.g., the T3413 timer), it is possible for the MME 125 to stop the ongoing paging procedure for the PS service.

The MME 125 may set a domain of an additional page message as PS, and then send the additional page message with a priority indicator to the ENB 110 in operations 424 and 426. The additional page message may include a priority indicator for requesting to preferentially perform the paging procedure for the CS service. Including a priority indicator in the additional page message even though paging that has occurred for the CS service does not have a priority, is to reduce the transmission delay according to the paging for the CS service than the general PS service. The MME 125 may set the domain as PS when sending the additional page message.

The ENB 110 may receive the additional page message with a priority indicator from the MME 125. The ENB 110 may handle the additional page message taking into account whether the additional page message includes a priority indicator in operation 428.

Since the additional page message includes a priority indicator, the ENB 110 may deliver the additional page message to the UE 135 in operation 430. In order to deliver the additional page message to the UE 135, it should be premised that the paging procedure according to the previously received initial page message is not completed. The delivery of the additional page message may enable the paging procedure for the CS domain to be performed between the ENB 110 and the UE 135.

For example, if the ENB 110 receives the additional page message before delivering the initial page message to the UE 135, the ENB 110 may deliver the additional page message to the UE 135 in preference to the initial page message in operation 430. In this case, since the UE 135 receives only the additional page message, the UE 135 may perform the paging procedure for the CS service in operation 432.

The ENB 110 may receive the additional page message after delivering the initial page message to the UE 135. In this case, the ENB 110 may deliver the additional page message to the UE 135 in operation 430. The UE 135 may disregard the received additional page message, since the paging procedure for the PS service is already initiated. Even when the UE 135 receives the additional page message after initiating the paging procedure for the PS service, the UE 135 may disregard the received additional page message.

It is assumed in FIG. 4 that a normal service (or a service with no priority) for the CS domain occurs while the MME is waiting for a response after paging a particular UE for a normal PS service. In this case, even for the normal service for the CS domain, the MME may send an additional page message with a priority indicator to the ENB.

The reason for sending an additional page message with a priority indicator even for the normal service with no priority is that generally, in the CS service, more real-time handling is required, compared with in the PS service. That the real-time handling is required means that it is important to reduce the time for which the page message is delivered.

If the additional page message with a priority indicator arrives, the ENB may deliver the additional page message to the UE in preference to the initial page message with no priority indicator.

Next, a scenario according to an embodiment that is implemented based on CSFB in the LTE system implemented by UTRAN/GERAN will be described in detail. A difference between a CSFB to 1×RTT-based case and a CSFB-based case lies in the setting of the domain in which the paging is to be handled. For example, in the case of 1×RTT, upon receiving a page message for the CS service from the CS network, the MME may set the domain for paging as PS. On the contrary, in the case of UTRAN/GERAN, upon receiving a page message for the CS service from the CS network, the MME may keep the domain for paging as CS.

Figure 5:
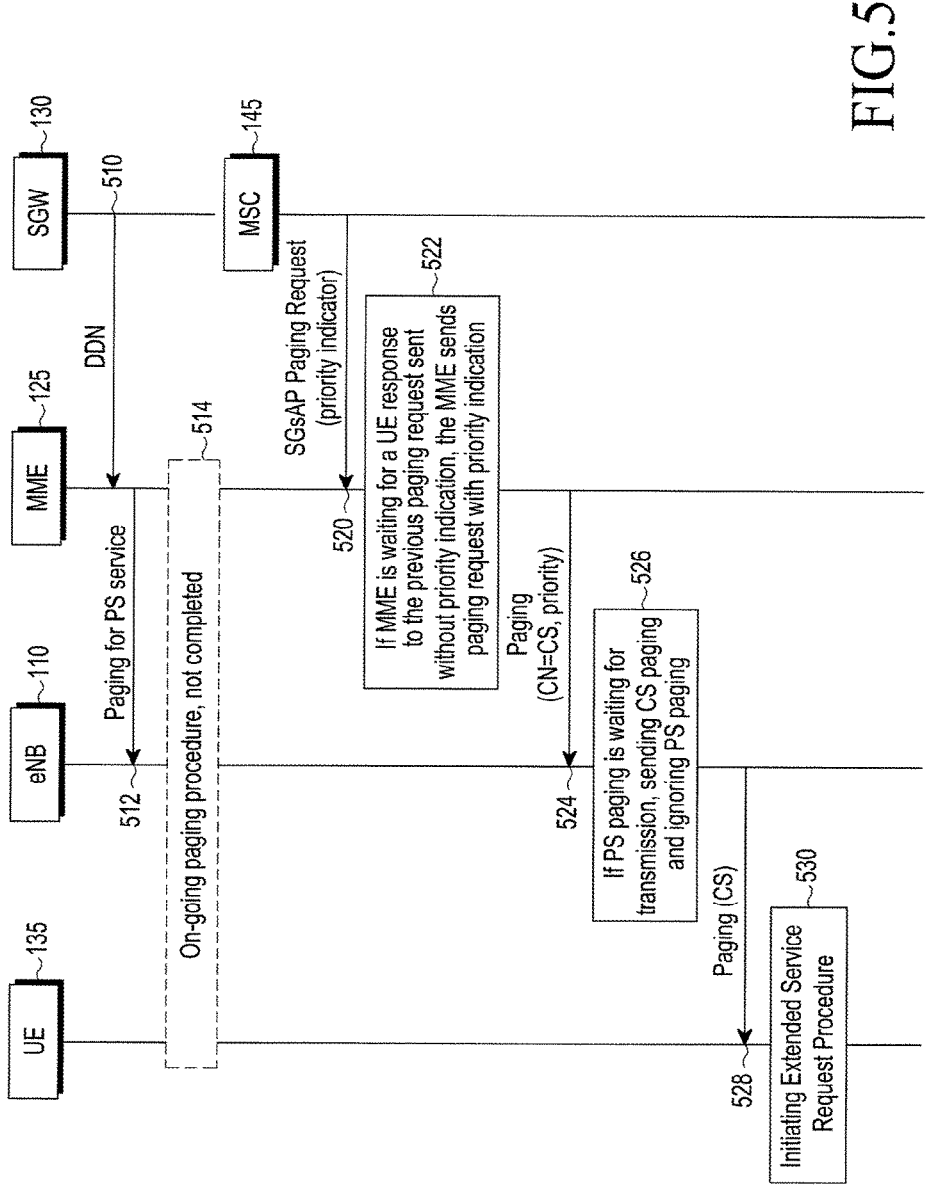
FIG. 5 illustrates a scenario for a paging procedure in an LTE system according to another embodiment of the present disclosure.

FIG. 5 illustrates a scenario for a paging procedure in an LTE system according to another embodiment of the present disclosure. The scenario shown in FIG. 5 is assumed as a situation in which based on CSFB, paging for the CS domain has occurred before paging for the PS domain is delivered to the UE.

Referring to FIG. 5, the S-GW 130 may send a DDN message, which is a paging request for a PS service, to the MME 125 in operation 510. The DDN message may include no priority identification information.

Upon receiving the DDN message, the MME 125 may perform the paging procedure for the PS domain.

For example, the MME 125 may page the ENB 110 where the particular UE 135 is located, for the PS service in operation 512. In other words, the MME 125 may send a page message (PS page message) for the PS service to the ENB 110. The particular UE 135 may be a UE in the idle mode, for which downlink PS data has occurred. For example, for the PS service, the MME 125 may send an initial page message with no priority indicator to the ENB 110.

Upon receiving the initial page message, the ENB 110 may page the UE 135 to which the ENB 110 will provide the PS service, and allow the paging procedure for the PS domain to be initiated through the paging, in operation 514. However, the procedure described below is not necessarily performed after paging for the UE 135 is made. In other words, the procedure described below may be performed before the paging for the UE 135 is made. In the following description, the expression "while the paging procedure for the PS domain is ongoing (e.g., while the paging procedure for the PS domain is not completed)" may be construed to include an expression "before paging for the UE 135 is made". This may generally correspond to a case where it is difficult for the ENB to smoothly handle all the paging requests since many paging requests are piled up in the paging queue of the ENB.

Paging for the CS service may occur before the paging procedure for the PS domain is completed. The paging for the CS service may occur as the MME 125 receives a page message (SGsAP Paging Request) with a priority indicator from the CSFB-based network.

For example, the MSC 145 of the CSFB-based network may send a page message (SGsAP Paging Request) with a priority indicator to the MME 125, for the CS service in operation 520.

If the MME 125 receives the page message (SGsAP Paging Request) for the CS domain from the MSC 145 while the paging procedure for the PS domain is not completed, the MME 125 may stop the ongoing paging procedure for the PS service and preferentially handle a paging procedure for the CS service.

For example, the state where the paging procedure for the PS domain is not completed means a state where a related timer (e.g., a T3413 timer) is in operation. Therefore, by stopping the operation of the related timer (e.g., the T3413 timer), it is possible for the MME 125 to stop the ongoing paging procedure for the PS service.

The MME 125 may send an additional page message with a priority indicator to the ENB 110 in operations 522 and 524. The priority indicator included in the additional page message will request to preferentially perform the paging procedure for the CS service. The MME 125 may set the domain as CS, or may keep the domain as CS if the domain is already set as CS.

The ENB 110 may receive the additional page message with a priority indicator from the MME 125. The ENB 110 may handle the additional page message taking into account whether the additional page message includes a priority indicator in operation 526.

Since the additional page message includes a priority indicator, the ENB 110 may deliver the additional page message to the UE 135 in operation 528. In order to deliver the additional page message to the UE 135, it should be premised that the paging procedure according to the previously received initial page message is not completed. The delivery of the additional page message may enable the paging procedure for the CS domain to be performed between the ENB 110 and the UE 135.

For example, if the ENB 110 receives the additional page message before delivering the initial page message to the UE 135, the ENB 110 may deliver the additional page message to the UE 135 in preference to the initial page message in operation 528. The ENB 110 may disregard or discard the initial page message that is not delivered due to the initial paging message's low priority.

Since the UE 135 receives only the additional page message, the UE 135 may perform an extended service request procedure for CSFB in operation 530.

It is assumed in FIG. 5 that a service (or a service with a priority) in the CS domain occurs for the same UE while the MME is waiting for a response to paging for the normal PS service from a particular UE in the LTE network that uses CSFB as UTRAN/GERAN. In this case, the MME may perform again the paging for the service with a priority. If the paging with a priority for the CS domain arrives from the MME, the ENB may deliver the paging with a priority to the UE in preference to the paging with no priority. By doing so, the UE may perform the extended service request procedure by the paging with a priority.

Figure 6:
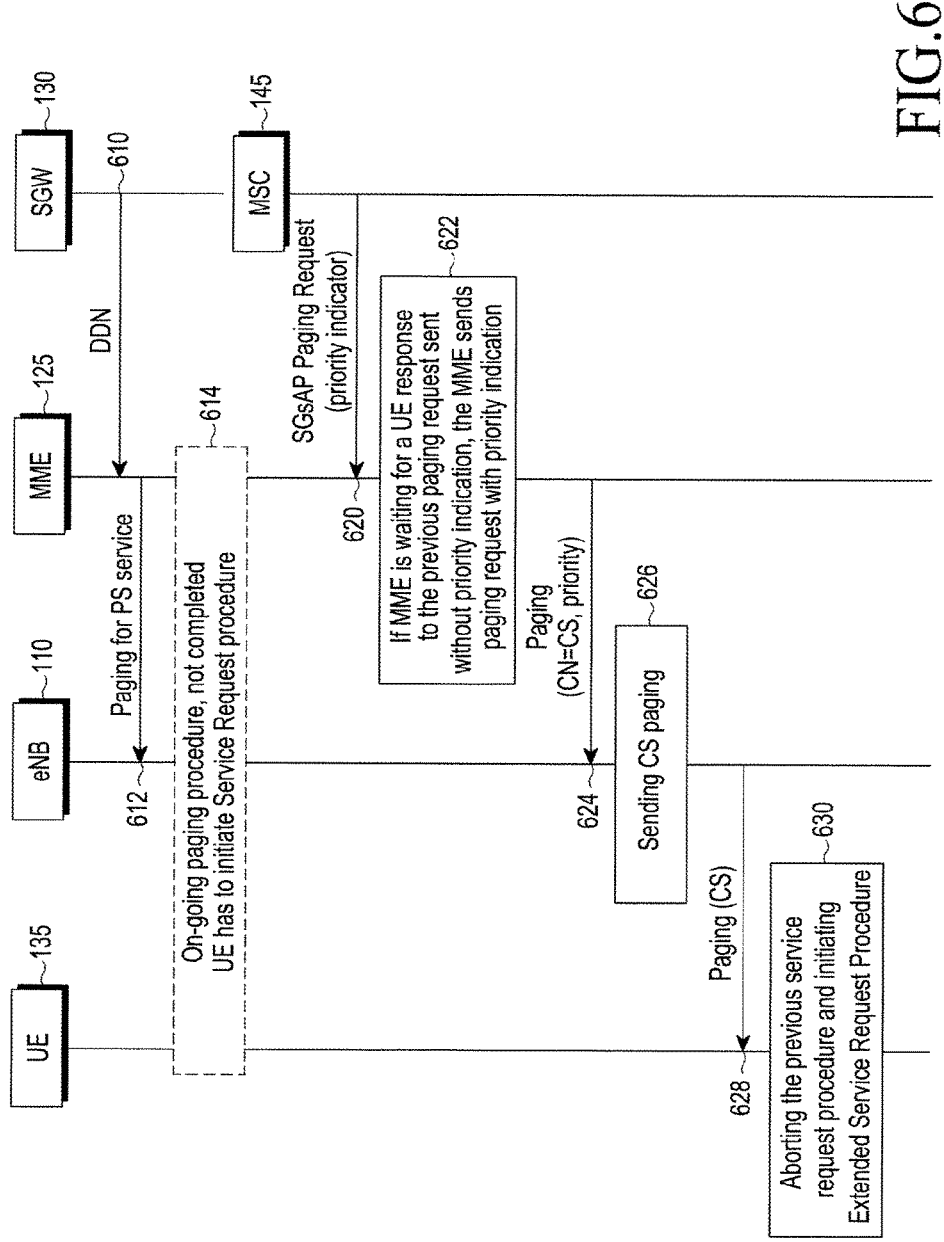
FIG. 6 illustrates another scenario for a paging procedure in an LTE system according to another embodiment of the present disclosure.

FIG. 6 illustrates another scenario for a paging procedure in an LTE system according to another embodiment of the present disclosure. The scenario shown in FIG. 6 is assumed as a situation in which based on CSFB, paging for the CS domain has occurred before paging for the PS domain is delivered to the UE.

Referring to FIG. 6, the S-GW 130 may send a DDN message, which is a paging request for a PS service, to the MME 125 in operation 610. The DDN message may include no priority identification information.

Upon receiving the DDN message, the MME 125 may perform the paging procedure for the PS domain.

For example, the MME 125 may page the ENB 110 where the particular UE 135 is located, for the PS service in operation 612. In other words, the MME 125 may send a page message (PS page message) for the PS service to the ENB 110. The particular UE 135 may be a UE in the idle mode, for which downlink PS data has occurred. For example, for the PS service, the MME 125 may send an initial page message with no priority indicator to the ENB 110.

Upon receiving the initial page message, the ENB 110 may page the UE 135 to which the ENB 110 will provide the PS service, and allow the paging procedure for the PS domain to be initiated through the paging, in operation 614. However, the procedure described below is not necessarily performed after paging for the UE 135 is made. In other words, the procedure described below may be performed before the paging for the UE 135 is made. However, in the following description, the expression "while the paging procedure for the PS domain is ongoing (e.g., while the paging procedure for the PS domain is not completed)" may be assumed as an expression "after paging for the UE 135 is made".

Paging for the CS service may occur before the paging procedure for the PS domain is completed. The paging for the CS service may occur as the MME 125 receives a page message (SGsAP Paging Request) with a priority indicator from the CSFB-based network.

For example, the MSC 145 of the CSFB-based network may send a page message (SGsAP Paging Request) with a priority indicator to the MME 125, for the PS service in operation 620.

If the MME 125 receives the page message (SGsAP Paging Request) for the CS domain from the MSC 145 while the paging procedure for the PS domain is not completed, the MME 125 may stop the ongoing paging procedure for the PS service and preferentially handle a paging procedure for the CS service.

For example, the state where the paging procedure for the PS domain is not completed means a state where a related timer (e.g., a T3413 timer) is in operation. Therefore, by stopping the operation of the related timer (e.g., the T3413 timer), it is possible for the MME 125 to stop the ongoing paging procedure for the PS service.

The MME 125 may send an additional page message with a priority indicator to the ENB 110 in operations 622 and 624. The priority indicator included in the additional page message will request to preferentially perform the paging procedure for the CS service. The MME 125 may set the domain as CS, or may keep the domain as CS if the domain is already set as CS.

The ENB 110 may receive the additional page message with a priority indicator from the MME 125. The ENB 110 may handle the additional page message taking into account whether the additional page message includes a priority indicator in operation 626.

Since the additional page message includes a priority indicator, the ENB 110 may handle the additional page message in operation 628. In order to deliver the additional page message to the UE 135, it should be premised that the paging procedure according to the previously received initial page message is not completed. The delivery of the additional page message may enable the paging procedure for the CS domain to be performed between the ENB 110 and the UE 135.

For example, even though the ENB 110 has received the additional page message after delivering the initial page message to the UE 135, the ENB 110 may deliver the additional page message to the UE 135 in operation 628.

At the time that the UE 135 receives the additional paging, if the UE 135 has sent a service request message by starting a service request process for the initial paging, the UE 135 may continue to perform the ongoing service request process for the initial paging. In other words, the UE 135 may continue to perform the paging procedure according to the initial paging.

However, at the time that the UE 135 receives the additional paging, if the UE 135 has not sent a service request message even though the UE 135 has started the service request process for the initial paging, it may be seen or determined by the ENB 110 or the MME 125 that the UE 135 has received two page messages (i.e., an initial page message and an additional page message).

In this case, the UE 135 may stop the paging procedure that was started by the initial paging. The UE 135 may start the paging procedure for the additional paging on behalf of the stopped paging procedure. When starting the paging procedure (or a service request procedure) for the additional paging, the UE 135 may send an extended service request message for CSFB to the ENB 110.

It is assumed in FIGS. 5 and 6 that a service with a priority has occurred from the CS network after paging for the PS service was made. However, it will be apparent to those of ordinary skill in the art that implementation of the proposed embodiment is possible even in the case where a normal service with no priority occurs from the CS network after the paging for the PS service is made.

For example, the MME may receive a page message (SGsAP Paging Request massage) for the CS service with no priority indicator from the CS network (or MSC) while waiting for a response to the initial paging. In this case, the MME may stop the T3413 timer in operation, and start a paging process for the CS service. For example, upon receiving the page message (SGsAP Paging Request massage) for the CS service with no priority indicator, the MME may set the domain as CS, and send the page message with a priority indicator to the ENB. The ENB may send an additional page message for the CS service to the UE at the request of the MME.

The reason why the MME delivers a page message with a priority to the UE through the ENB even though the MME receives a page message with no priority, is that generally, the CS service is higher in priority than the PS service.

In the general LTE system, a node (an MME or a Serving GPRS Support Node (SGSN)) constituting the Core Network (CN) may inquire of the RAN about radio capability match. For example, when providing an IMS voice over PS service for a UE located in a specific area, the node may inquire of the RAN whether the radio capability of the UE and the radio capability of the RAN (e.g., E-UTRAN/UTRAN or GERAN) are matched with each other.

A request for the radio capability match should be made when there is a possible change in support of the IMS voice over PS service by the UE. However, if the radio capability match request occurs too frequently, signaling overload may occur between the ENB and the CN. Therefore, there is need for an approach for preventing the signaling overload. For example, there is a way to provide a network configuration and a criterion in the MME so that the inquiry about the radio capability match may occur restrictively only when necessary.

Depending on the configuration status of the network, the operator may determine the unit of area as a Tracking Area (TA) list or an MME pool area so that the voice support for the UE may be matched.

If the voice support is matched in units of the TA list, this means that the user can receive the same voice service while moving between TAs belonging to the TA list. An example of the voice service may include a serviced in which the UE is supported Single Radio Voice Call Continuity (SRVCC) by a nearby Frequency Division Duplex (FDD) UTRAN, while using VoLTE based on TDD-LTE.

If the network is configured so that the same voice support may be made in units of the TA list, the MME may avoid the unnecessary inquiry about the radio capability match.

If the network is configured so that the same voice service may be supported in units of a specific area, the MME may inquire of the ENB about the radio capability match only when the UE is out of the specific area. In this case, the MME may avoid the unnecessary inquiry about the radio capability match. The specific area may refer to an area where the voice service is provided at a certain level (homogeneous).

The MME may determine whether the UE is out of the specific area, by comparing an area ID indicating the current area of the UE with a previously registered area ID. For example, if the specific area is the MME pool area, the MME may determine whether the UE is out of the specific area, by comparing the received existing Globally Unique MME Identifier (GUMMEI) (or an old GUMMEI) with the UE's own GUMMEI.

Figure 7:
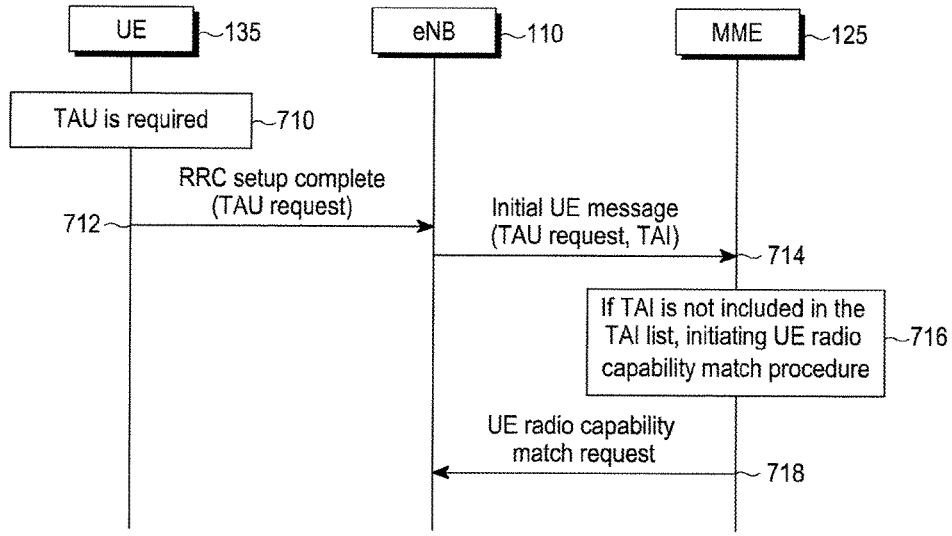
FIG. 7 illustrates a scenario for a procedure for inquiring about radio capability match in an LTE system according to an embodiment of the present disclosure.

FIG. 7 illustrates a scenario for a procedure for inquiring about radio capability match in an LTE system according to an embodiment of the present disclosure. The scenario shown in FIG. 7 is assumed as a case in which a network is configured so that the same voice service may be supported in units of the TA list.

Referring to FIG. 7, the UE 135 may continue to monitor whether the condition that Tracking Area Update (TAU) is started is satisfied, in operation 710. If the condition that TAU is started is satisfied, the UE 135 may send a TAU request message to the ENB 110 by including the TAU request message in a Radio Resource Control (RRC) message in operation 712. For example, the condition that TAU is started may be assumed as the condition that RRC setup is completed.

Upon receiving the TAU request message from the UE 135, the ENB 110 may send a TAU request message including a Tracking Area Identity (TAI) in which the ENB 110 is included, to the MME 125 in operation 714. For example, the TAU request message may be delivered to the MME 125 using an initial UE message.

The MME 125 may determine in operation 716 whether the TAI received from the ENB 110 is included in a TAI list of a UE context that is stored in the MME 125 or received from another MME/SGSN. If the received TAI is not included in the TAI list, the MME 125 may determine that the UE 135 is out of the area where the same voice service is provided, which is configured in units of the TAI list. In this case, the MME 125 may send a radio capability match request message for inquiring about the radio capability match to the ENB 110 in operation 718.

Figure 8:
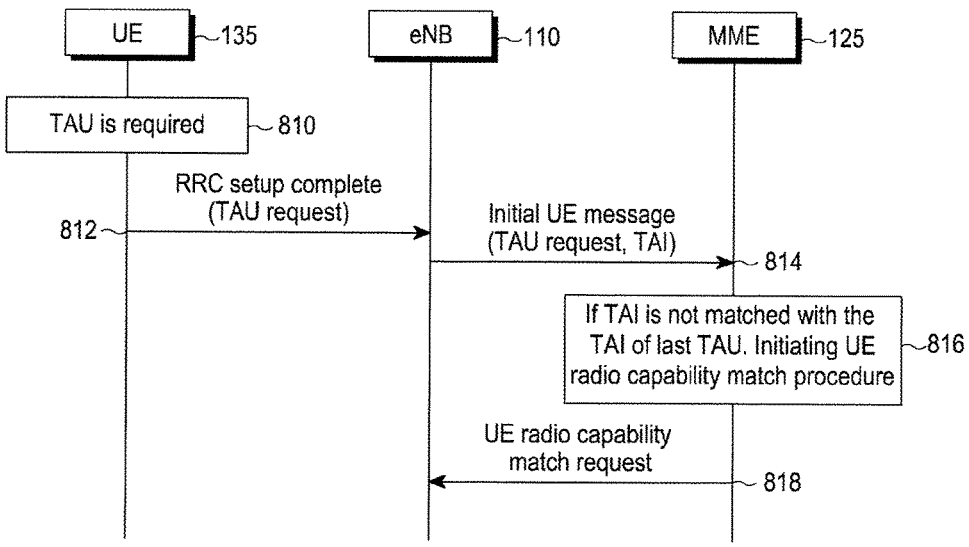
FIG. 8 illustrates another scenario for a procedure for inquiring about radio capability match in an LTE system according to an embodiment of the present disclosure.

FIG. 8 illustrates another scenario for a procedure for inquiring about radio capability match in an LTE system according to an embodiment of the present disclosure. The scenario shown in FIG. 8 is assumed as a case in which a network is configured so that the same voice service may be supported in units of the TA.

Referring to FIG. 8, the UE 135 may continue to monitor whether the condition that TAU is started is satisfied, in operation 810. If the condition that TAU is started is satisfied, the UE 135 may send a TAU request message to the ENB 110 by including the TAU request message in an RRC message in operation 812. For example, the condition that TAU is started may be assumed as the condition that RRC setup is completed.

Upon receiving the TAU request message from the UE 135, the ENB 110 may send a TAU request message including a TAI in which the ENB 110 is included, to the MME 125 in operation 814. For example, the TAU request message may be delivered to the MME 125 using an initial UE message.

The MME 125 may determine in operation 816 whether the TAI received from the ENB 110 is the same as a particular TAI of a UE context that is stored in the MME 125 or received from another MME/SGSN. For example, the particular TAI may be TAU of the TA where the UE 135 has most recently performed TAU.

If the received TAI is not the same as the particular TAI, the MME 125 may determine that the UE 135 is out of the area where the same voice service is provided, which is configured in units of the TA. In this case, the MME 125 may send a radio capability match request message for inquiring about the radio capability match to the ENB 110 in operation 818.

Figure 9:
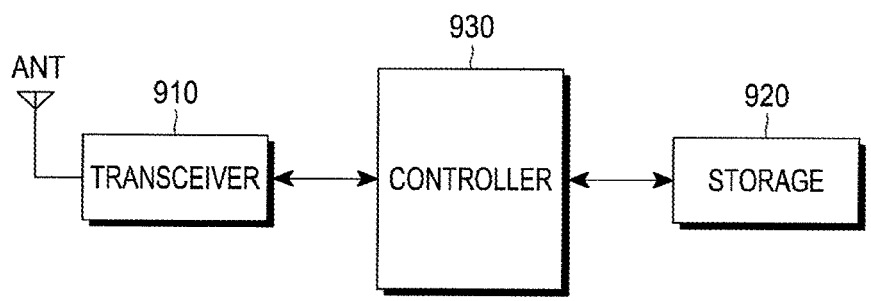
FIG. 9 illustrates a structure of an ENB according to an embodiment of the present disclosure.

FIG. 9 illustrates a structure of an ENB according to an embodiment of the present disclosure. The ENB shown in FIG. 9 may include a transceiver 910, a storage 920 and a controller 930.

Referring to FIG. 9, the transceiver 910 may transmit and receive data to/from a UE using radio resources. The transceiver 910 may transmit and receive data to/from an MME based on a predefined interface.

The transceiver 910 may receive data over a wireless channel or a wired channel, and provide the received data to the controller 930, and may transmit data provided from the controller 930 over a wireless channel or a wired channel.

A receiver constituting the transceiver 910 may receive paging from the MME and deliver the received paging to the controller 930. A transmitter constituting the transceiver 910 may send a page message to the UE under control of the controller 930.

The storage 920 may store programs and data necessary for operations of the ENB.

The controller 930 may control the overall operation of the ENB for paging the UE in the idle mode. For example, if the controller 930 receives additional paging (or an additional page message) for the CS service through the receiver before the paging procedure according to the PS service is completed, the controller 930 may control the transmitter to send a page message according to the additional paging to the UE. The additional page message for the CS service may include priority identification information.

The controller 930 may perform control for handling additional paging that is received before the ENB sends a page message for the PS service to the UE or while the paging procedure by transmission of a page message for the PS service is not completed even though the ENB has sent a page message for the PS service.

If additional paging for the CS service is received while the paging procedure by the initial paging for the PS service is not completed, the controller 930 may control the ENB to operate according to the scenarios shown in FIGS. 3 to 6.

Although not illustrated in a separate drawing, a UE according to an embodiment of the present disclosure may have the same structure as that shown in FIG. 9. However, the UE may perform an operation different from that of the ENB, which has been described with reference to FIG. 9.

For example, the transceiver 910 may receive a page message for the PS service or a page message for the CS service, and transmit and receive a signal according to a paging procedure defined for the received page message under control of the controller 930.

The controller 930 may control the overall operation of the UE based on the page message provided from the ENB. For example, the controller 930 may perform control for handling additional paging received from the ENB when the UE receives an initial page message for the PS service from the ENB or while the paging procedure according to the received initial page message is not completed.

If additional paging for the CS service is received while the paging procedure by the initial paging for the PS service is not completed, the controller 930 may control the overall operation for the UE to operate according to the scenarios shown in FIGS. 3 to 6.

Figure 10:
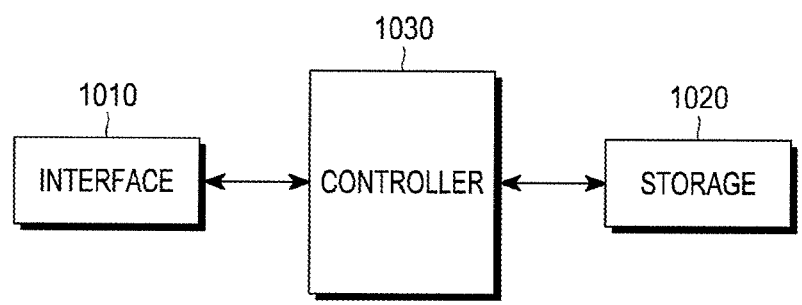
FIG. 10 illustrates a structure of a core network node according to an embodiment of the present disclosure.

FIG. 10 illustrates a structure of a Core Network node (hereinafter referred to as a 'CN node') according to an embodiment of the present disclosure. The CN node, for example, an MME, shown in FIG. 10 may include an interface 1010, a storage 1020 and a controller 1030.

Referring to FIG. 10, the interface 1010 may perform a signal processing function for wired communication with other devices. The storage 1020 may store programs and data necessary for operations of the CN node. The controller 1030 may control the overall operation of the CN node to page the UE in the idle mode.

If additional paging for the CS service is received from the CS network while the paging procedure according to the initial paging for the PS service is not completed, the controller 1030 may control the overall operation for handling the received additional paging. For example, the controller 1030 may control the overall operation for the MME so that the operations by the scenarios shown in FIGS. 3 to 6 may be performed in the LTE system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for handling a paging message by a mobility management entity (MME) in a wireless communication network, the method comprising:
transmitting, to a base station, a first paging message for a packet switched (PS) service without a paging priority;
while waiting for a response of a terminal to the first paging message, receiving, from a circuit switched (CS) network, a message to page the terminal;
identifying whether the message includes priority information; and
transmitting, to the base station, a second paging message with the paging priority to page the terminal if the message includes the priority information.

2. The method of claim 1, wherein the message is a CS page message.

3. The method of claim 1, wherein the priority information indicates to handle the second paging message in preference to the first paging message.

4. A mobility management entity (MME) for handling a paging message in a wireless communication network, the MME comprising:
an interface configured to perform communication with an external device; and
a controller coupled with the interface and configured to:
control the interface to transmit, to a base station, a first paging message for a packet switched (PS) service without a paging priority;
while waiting for a response of a terminal to the first paging message, control the interface to receive, from a circuit switched (CS) network, a message to page the terminal;
identify whether the message includes priority information; and
control the interface to transmit, to the base station, a second paging message with the paging priority to page the terminal if the message includes the priority information.

5. The MME of claim 4, wherein the message is a CS page message.

6. The MME of claim 4, wherein the priority information indicates to handle the second paging message in preference to the first paging message.

7. A method for handling circuit switched fallback (CSFB) by a base station in a wireless communication network, the method comprising:
receiving, from a mobility management entity (MME), a second paging message to page a terminal, before transmitting a first paging message to the terminal;
detecting whether the second paging message includes a paging priority; and
transmitting, to the terminal, a third paging message based on the second paging message in preference to the transmission of the first paging message if the second paging message includes the paging priority.

8. The method of claim 7, wherein the first paging message is a paging message for a service on a packet switched (PS) network, and the second paging message is a paging message for a service on a circuit switched (CS) network.

9. A base station for handling circuit switched fallback (CSFB) in a wireless communication network, the base station comprising:
a transceiver; and
a controller coupled with the transceiver and configured to:
control the transceiver to receive, from a mobility management entity (MME), a second paging message to page a terminal, before transmitting a first paging message to the terminal;
detect whether the second paging message includes a paging priority; and
control the transceiver to transmit, to the terminal, a third paging message based on the second paging message in preference to the transmission of the first paging message if the second paging message includes the paging priority.

10. The base station of claim 9, wherein the first paging message is a paging message for a service on a packet switched (PS) network, and the second paging message is a paging message for a service on a circuit switched (CS) network.

11. A method for handling circuit switched fallback (CSFB) by a base station in a wireless communication network, the method comprising:
receiving, from a mobility management entity (MME), a second paging message to page a terminal, before a paging procedure with the terminal based on a first paging message is completed;
detecting whether the second paging message includes a paging priority; and
transmitting, to the terminal, a third paging message based on the second paging message if the second paging message includes the paging priority.

12. The method of claim 11, wherein the first paging message is a paging message for a service on a packet switched (PS) network, and the second paging message is a paging message for a service on a circuit switched (CS) network.

13. A base station for handling circuit switched fallback (CSFB) in a wireless communication network, the base station comprising:
- a transceiver; and
- a controller coupled with the transceiver and configured to:
  - control the transceiver to receive, from a mobility management entity (MME), a second paging message to page a terminal, before a paging procedure with the terminal based on a first paging message is completed;
  - detect whether the second paging message includes a paging priority; and
  - control the transceiver to transmit, to the terminal, a third paging message based on the second paging message if the second paging message includes the paging priority.

14. The base station of claim 13, wherein the first paging message is a paging message for a service on a packet switched (PS) network, and the second paging message is a paging message for a service on a circuit switched (CS) network.

* * * * *